United States Patent
Khoe et al.

(10) Patent No.: US 6,558,556 B1
(45) Date of Patent: May 6, 2003

(54) IRON-CATALYSED OXIDATION OF MANGANESE AND OTHER INORGANIC SPECIES IN AQUEOUS SOLUTIONS

(75) Inventors: Ging Hauw Khoe, Cronulla (AU); Myint Zaw, Lidcombe (AU)

(73) Assignees: Australian Nuclear Science and Technology Organisation, New South Wales (AU); CRC for Waste Management & Pollution Control, Ltd., New South Wales (AU)

( * ) Notice: Subject to any disclaimer, the term of this patent is extended or adjusted under 35 U.S.C. 154(b) by 0 days.

(21) Appl. No.: 09/744,927
(22) PCT Filed: Jul. 30, 1999
(86) PCT No.: PCT/AU99/00620
§ 371 (c)(1),
(2), (4) Date: Mar. 27, 2001
(87) PCT Pub. No.: WO00/07942
PCT Pub. Date: Feb. 17, 2000

(30) Foreign Application Priority Data

Jul. 31, 1998 (AU) .............................................. PP5008

(51) Int. Cl.⁷ .................................................. C02F 1/72
(52) U.S. Cl. ........................ 210/758; 210/763; 210/912
(58) Field of Search ................................ 210/758, 763, 210/912

(56) References Cited

U.S. PATENT DOCUMENTS 4,622,149 A * 11/1986 Devuyst et al.
5,358,643 A * 10/1994 McClintock
5,368,703 A * 11/1994 Brewster

* cited by examiner

Primary Examiner—Betsey Morrison Hoey
(74) Attorney, Agent, or Firm—Michael Best & Friedrich, LLC.

(57) ABSTRACT

A method of oxidizing an inorganic species in an aqueous solution of pH 5 or greater, comprises the steps of (i) supplying an oxidizable form of a sulfur compound, and oxygen to the solution; and (ii) adding a source of iron to the solution and allowing oxidation to take place. The method finds particular application in the treatment of manganese and other species in potable water, industrial waste waters and process liquors.

14 Claims, 5 Drawing Sheets

2

IRON-CATALYSED OXIDATION OF MANGANESE AND OTHER INORGANIC SPECIES IN AQUEOUS SOLUTIONS

FIELD OF THE INVENTION

The present invention relates to a method for oxidising (and optionally removing) manganese and other inorganic species in aqueous solutions. For example, the invention relates to the treatment of manganese and other inorganic species in potable water, industrial waste waters and process liquors.

BACKGROUND TO THE INVENTION

Many drinking water supplies across the world are contaminated by trace contaminants such as manganese, arsenic and heavy metals. Manganese is also present in mining and mineral processing effluents. The removal of trace contaminants to very low concentrations is often required for aesthetic reasons (e.g. the presence of manganese gives rise to "dirty or black water" problems and can result in soiling of clothes and staining of household fixtures when present in concentrations in excess of 0.020 mg/L in drinking water) or for health reasons (the WHO drinking water guideline for arsenic is 0.010 mg/L).

Manganese removal is often difficult because dissolved divalent manganese (Mn(II)) is poorly adsorbed by coagulants commonly used for water treatment such as iron and aluminium compounds. Consequently, the removal of trace manganese requires a pre-oxidation step in which dissolved manganese(II) is converted to the insoluble manganese(III) and/or (IV) oxides (or oxyhydroxides). Thereafter, a coagulation step using iron or aluminium salt can be used to remove the manganese oxide particles.

The oxidative precipitation of manganese in ambient conditions, however, requires powerful oxidants such as permanganate (the oxidation rate using chlorine is usually too slow) which can be expensive and difficult to handle.

The removal of arsenic from process liquors by the oxidation of iron(II), arsenic(III) and sulfur(IV) with oxygen has been studied (T. Nishimura et al., "Removal of Arsenic from Process Liquors by Oxidation of Iron(II), Arsenic(III) and Sulfur(IV) with Oxygen", *Proceedings of the second International Symposium on Iron Control in Hydrometallurgy*, CIM, Montreal, Ottawa, Canada, 1996, 535–547). However, it was disclosed in this paper that in the presence of dissolved iron, the oxidation reactions (As(III) to As(V), and Fe(II) to Fe(III)) were only effective at 2<pH<5.

SUMMARY OF THE INVENTION

Surprisingly, the present inventors have discovered that the addition of iron(III) compounds in neutral or alkaline aqueous solutions can accelerate the rate of oxidation of manganese and other inorganic species in the presence of oxygen and sulfur(IV). This is despite the fact that iron exists in a solid (precipitated) form in these solutions.

Accordingly, the present invention provides a method for oxidising an inorganic species in an aqueous solution of pH 5 or greater, comprising the steps of:
 (i) supplying an oxidisable form of a sulfur compound, and oxygen to the solution; and
 (ii) adding a source of iron to the solution and allowing oxidation to take place wherein said source of iron provides an iron based catalyst for the oxidation reaction.

Typically the source of iron is a soluble iron(III) compound such as ferric-chloride or sulfate.

Alternatively, iron(II) can be supplied to the solution in a form which can be readily oxidised to iron(III) (eg. as ferrous sulfate), which then accelerates the oxidation reaction.

Typically the species oxidised is manganese and preferably oxidation is effected by the addition of sodium sulfite and oxygen (air) in the presence of an iron compound (eg. as precipitated iron compounds). Furthermore, the product resulting from the added iron can subsequently (and advantageously) serve as a coagulant to remove the oxidised species from the solution.

Oxygen is advantageously used as the oxidising agent because it has no residual contaminating after-effects. Sulfur sources can be selected, (e.g. sulfite or $SO_2$ gas) such that in the oxidising procedure, a relatively benign product is produced (eg sulfate). Whilst the final product of using sulfite is a relatively benign dissolved sulfate, it is still preferable to use it sparingly, especially if an ion-exchange process is subsequently used to remove the contaminant (e.g. arsenic). In this latter case residual dissolved sulfate of no more than 25 mg/L is preferred, as this then enables effective arsenic(V) removal (i.e. sulfate and arsenate may otherwise compete for sites on the ion-exchange material).

The oxidisable sources of sulfur can be $SO_3^{2-}$, $S_2O_3^{2-}$, $S_4O_6^{2-}$, $SO_2(g)$, aqueous $SO_2$, or $HSO_3^-$. However, sulfur dioxide and sulfite are the most preferred sources. Also, waste sulfur dioxide gas may be available for use in industrial applications.

Typically the process is applied in the treatment of trace quantities of inorganic species but the process can also find application with more concentrated quantities of contaminants (e.g. in geothermal waters, leachates obtained from smelter wastes, industrial process liquors etc).

In addition to manganese, the species oxidised can include one or more of arsenic, sulfide, selenium and may also include uranium, cobalt, antimony, bismuth and other inorganic species.

Typically the oxygen is sparged into the aqueous solution as air but other methods of addition are possible As indicated above, the solution is typically a drinking water solution, an industrial waste water or process liquor etc.

Typically the pH of the solution is, if necessary, made to be near neutral or basic.

BRIEF DESCRIPTION OF THE DRAWINGS

Notwithstanding any other forms which may fall within the scope of the present invention, preferred forms of the invention will now be described, by way of example only, with reference to the accompanying drawings and the following non-limiting examples. In the drawings:

in FIG. 5(b) sulfur dioxide gas at 0.02 L/min was used instead of sodium sulfite solution. Iron was added at 4 mg/L and air was sparged at 2.5 L/min.

MODES FOR CARRYING OUT THE INVENTION

Figure 1:
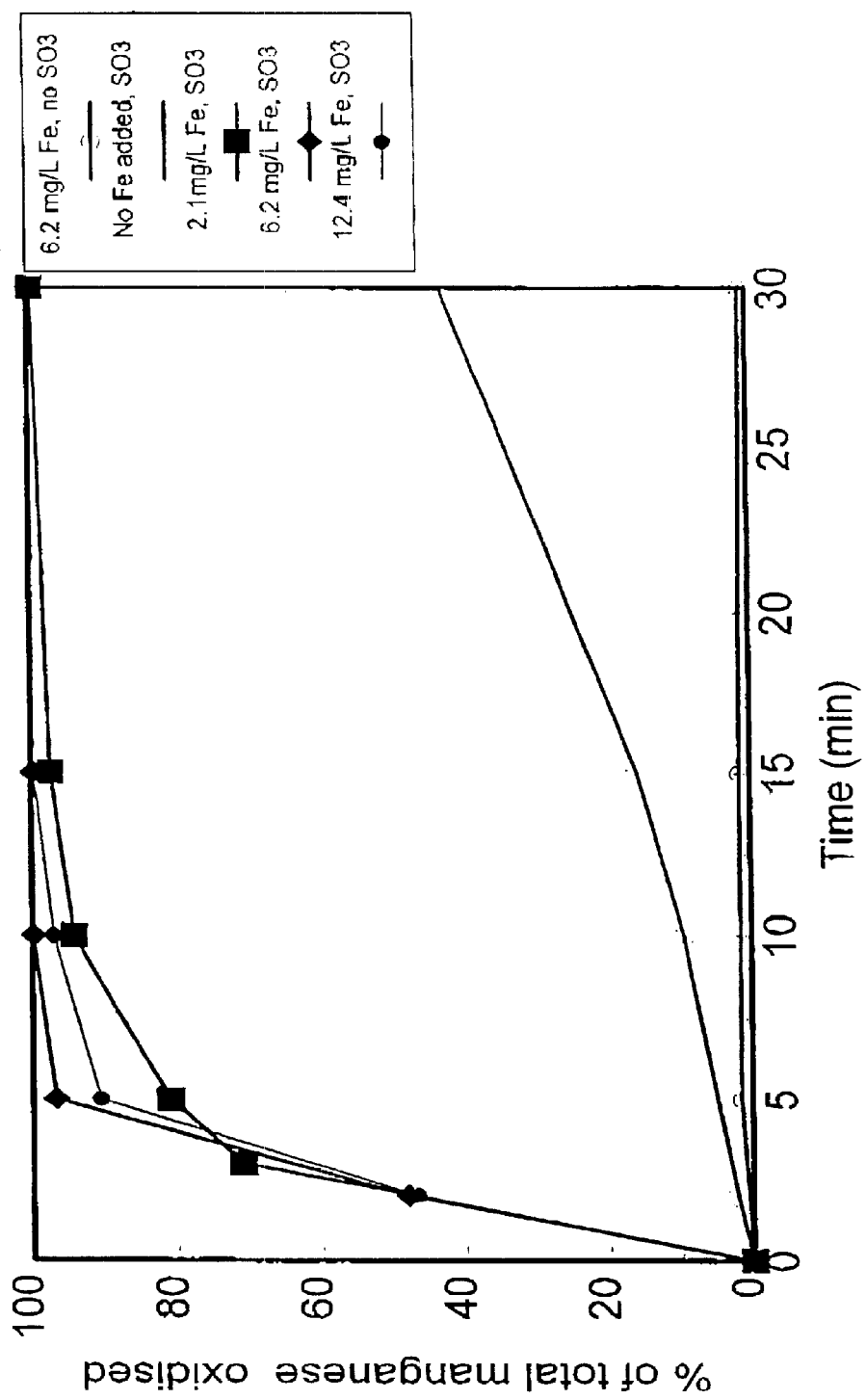
FIG. 1 graphs the oxidation of manganese(II) as a function of added iron(III) concentrations. In this graph the initial manganese(II) concentration was 5 mg/L, sodium sulfite solution was added to 1.7 liters of a reaction mixture at a dose rate of 8 mg S/L/min, air was sparged at a rate of 2.5 L/min and pH was maintained at 6.5. Dissolved manganese(II) concentrations were determined using electron paramagnetic resonance (EPP) spectroscopy FIG. 2 graphs the oxidation of dissolved manganese(II) using sulfite and oxygen at pH 8(adjusted using sodium bicarbonate) in the presence/absence of iron(III). Sodium sulfite solution was added at a dose rate of 8 mg S/L/min and air was sparged at a rate of 2.5 L/min. The initial conditions were: solution volume 1.7 L manganese(II) concentration 5 mg/L. Dissolved manganese (II) concentrations were determined using EPR spectroscopy.

Referring firstly to the drawings, FIG. 1 shows the rates of oxidation of manganese(II) as a function of added iron (III) concentrations. The percentage of total manganese oxidised was calculated from the initial dissolved manganese(II) concentration (5 mg/L) and the dissolved manganese(II) concentrations in the solution as a function of time (determined using electron paramagnetic resonance (EPR) spectroscopy). Sodium sulfite solution was added to the synthetic reaction mixture of 1.7 liter at a dose rate of 8 mg S/L/min, air was sparged at a rate of 2.5 L/min and the pH of the reaction mixture was maintained at 6.5 by the addition of sodium hydroxide solution. Experimental data with iron added but without sulfite dosing are also shown.

FIG. 1 clearly indicates that the added iron significantly catalyses the oxidation of dissolved manganese(II). After the oxidation reaction was completed, a mixture of brown and black particles settled at the base of the reaction vessel indicating that iron-hydroxide and manganese-oxide or -oxyhydroxide solids had been formed (manganese(III)- or manganese(IV)-oxide or -oxyhydroxide precipitate is black).

The curve pertaining to the experimental data with 6.2 mg/L of iron added but without sulfite dosing (FIG. 1) shows that the manganese(II) concentration in the solution remained unchanged throughout the experiment (the same results were obtained irrespective of whether the iron precipitates were removed by membrane filtration (0.45 $\mu$m) before EPR spectroscopy analyses for manganese(II)). This indicates negligible adsorption of un-oxidised manganese (II) on the iron(III)-hydroxide precipitate.

Figure 2:
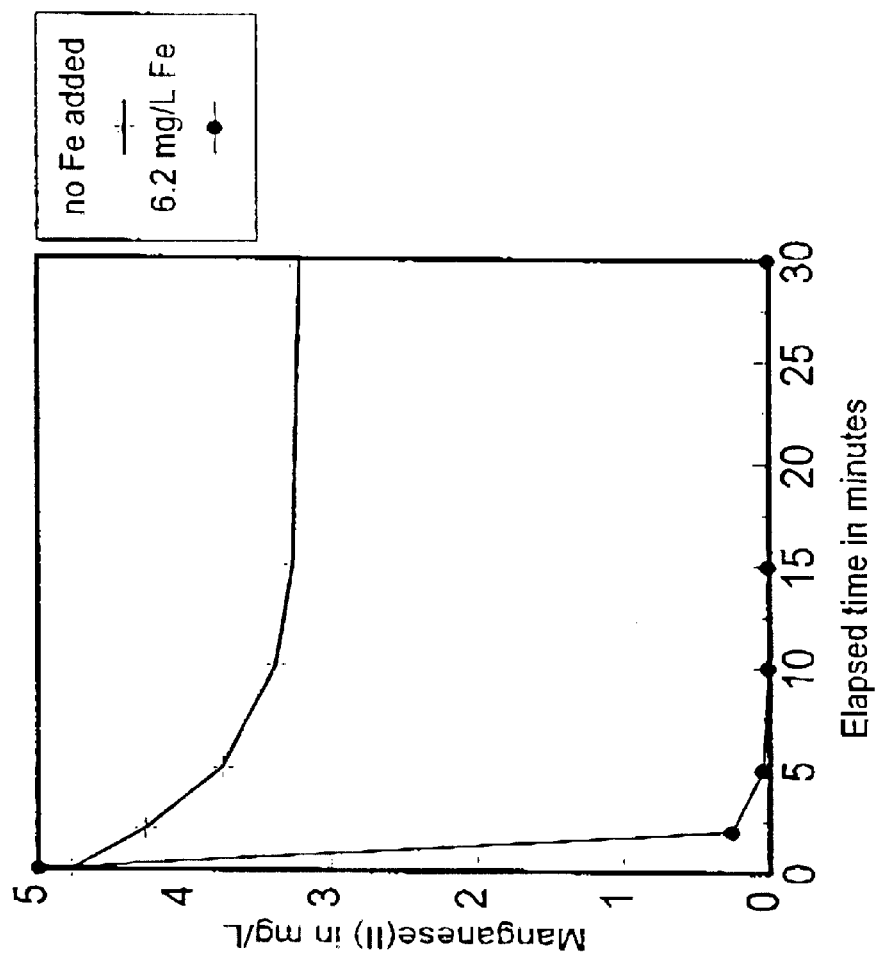

FIG. 2 depicts the oxidation of dissolved manganese(II) using sulfite and oxygen at pH 8(adjusted using sodium bicarbonate). Residual manganese(II) concentrations as a function time are shown in the presence/absence of iron(III). Clearly, the presence of bicarbonate at higher pH does not affect the rate of oxidation of manganese(II). In fact, as shown in FIG. 2 when compared to the results given in FIG. 1, the rate off manganese oxidation increased with the addition of sodium bicarbonate.

Sodium sulfite solution was added at a dose rate of 8 mg S/L/min and air was sparged at a rate of 2.5 L/man. The initial conditions were: solution volume 1.7 L manganese(II) concentration 5 mg/L. Dissolved manganese(II) concentrations were determined using EPR spectroscopy.

FIGS. 3(a) and 3(b) show the results of tests as in FIGS. 1 and 2 but using water taken from Nepean dam, one of the several reservoirs for water supply in Sydney, Australia (the compositions are given in Table 1 below). The initial dissolved manganese(II) concentration in the dam water was increased from 0.15 mg/L to 0.55 (FIG. 3(a)) and 5.15 mg/L (FIG. 3(b)) by spiking in order to facilitate EPR spectroscopy measurements.

FIGS. 3(a) and 3(b) show that increasing the water pH to 8.5 resulted in the oxidation reaction being completed in less than 5 and 10 minutes for the initial concentrations of 0.55 and 5.15 mg/L respectively. It should be noted that the concentration of dissolved organic carbon in the water was not low (7 mg/L).

Figure 3:
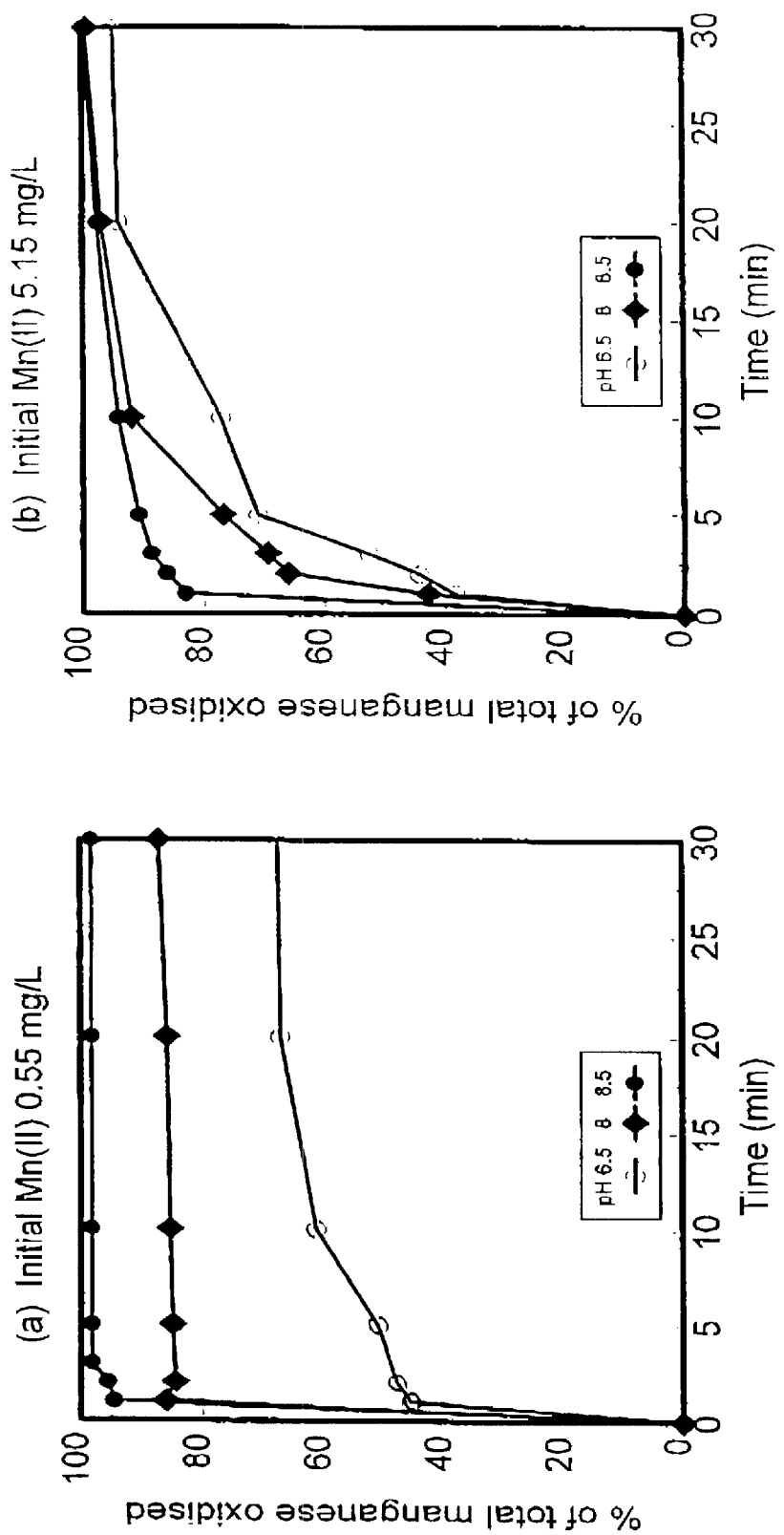
FIGS. 3(a) and (b) graph the oxidation of manganese(II) as a function of pH using Nepean dam water which had been spiked to (a) 0.55 mg/L or (b) 5.15 mg/L manganese(II) concentration. Iron(III) was added to 1.7 liter of dam water at a concentration of 15 mg Fe/L; sodium sulfite solution at a dose rate of 8 mg S/L/min, air at a rate of 2.5 L/min and pH was maintained at 6.5, 8 or 8.5. Dissolved manganese(II) concentrations were determined using EPR spectroscopy.
Figure 4:
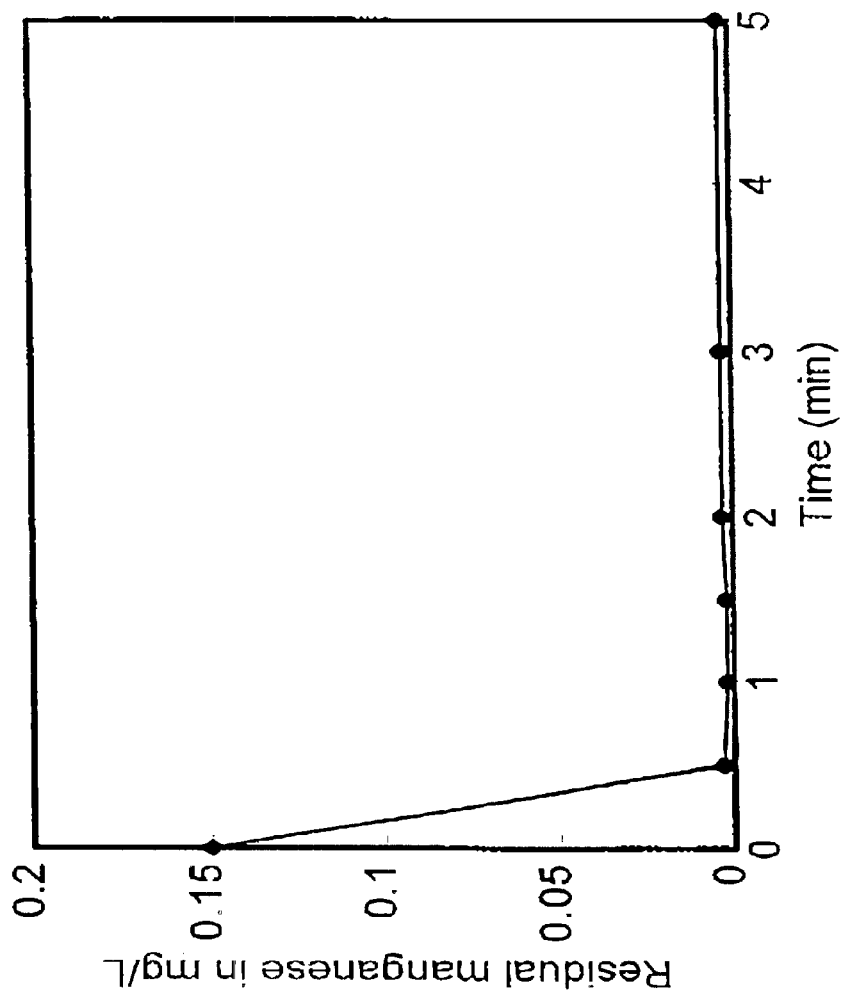
FIG. 4 graphs residual manganese concentrations in 1.7 liter of Nepean dam water as a function of time. The solution pH was maintained at pH 8.5, sodium sulfite was added at 3.2 mg S/L/min, iron at 10 mg/L and air was sparged at a flow rate 2.5 L/min. Dissolved manganese concentrations were determined using ICP-AES after samples had been filtered through 0.45 micron membrane.

In contrast to the results shown in FIGS. 1 to 3 in which specific measurements of the aquated (dissolved) manganese(II) concentrations were determined using EER spectroscopy, residual concentrations of total manganese in the Nepean dam water are shown in FIG. 4. They were determined by ICP-AES method after filtration using a 0.45 $\mu$m membrane filter. FIG. 4 shows that the initial dissolved manganese(II) concentration of 0.15 mg/L in the Nepean darn water (no spiking) was reduced to 0.003 mg/L in ½ minute. 1.7L of the dam water was treated with sodium sulfite solution added at a dose rate of 3.2 mg S/L/min. Air was sparged at a rate of 2.5 L/min, ferric chloride was added at 6.2 mg Fe/L and the pH was adjusted using sodium hydroxide solution at pH 8.5. Thus, during the treatment of Nepean water, less than 10 mg/L of sulfate was generated from the oxidation of added sulfite into the water.

TABLE 1

Composition of the Nopean dam water on May 6, 1999

| Analyte | Concentration in mg/L unless otherwise stated |
| --- | --- |
| Manganese | 0.15 |
| Iron | 0.64 |
| Aluminium | 0.05 |
| Sodium | 6.01 |
| Potassium | 0.72 |
| Calcium | 1.45 |
| Magnesium | 1.64 |
| Chloride | 10.65 |
| Sulfate | 2.17 |
| Nitrate | 0.92 |
| Dissolved organic carbon | 7 |
| Alkalinity | 8 |
| PH | 6.58 |
| Colour, Hazen unit | 48 |
| Turbidity, NTU | 1.2 |

Arsenic(III) Oxidation

Figure 5:
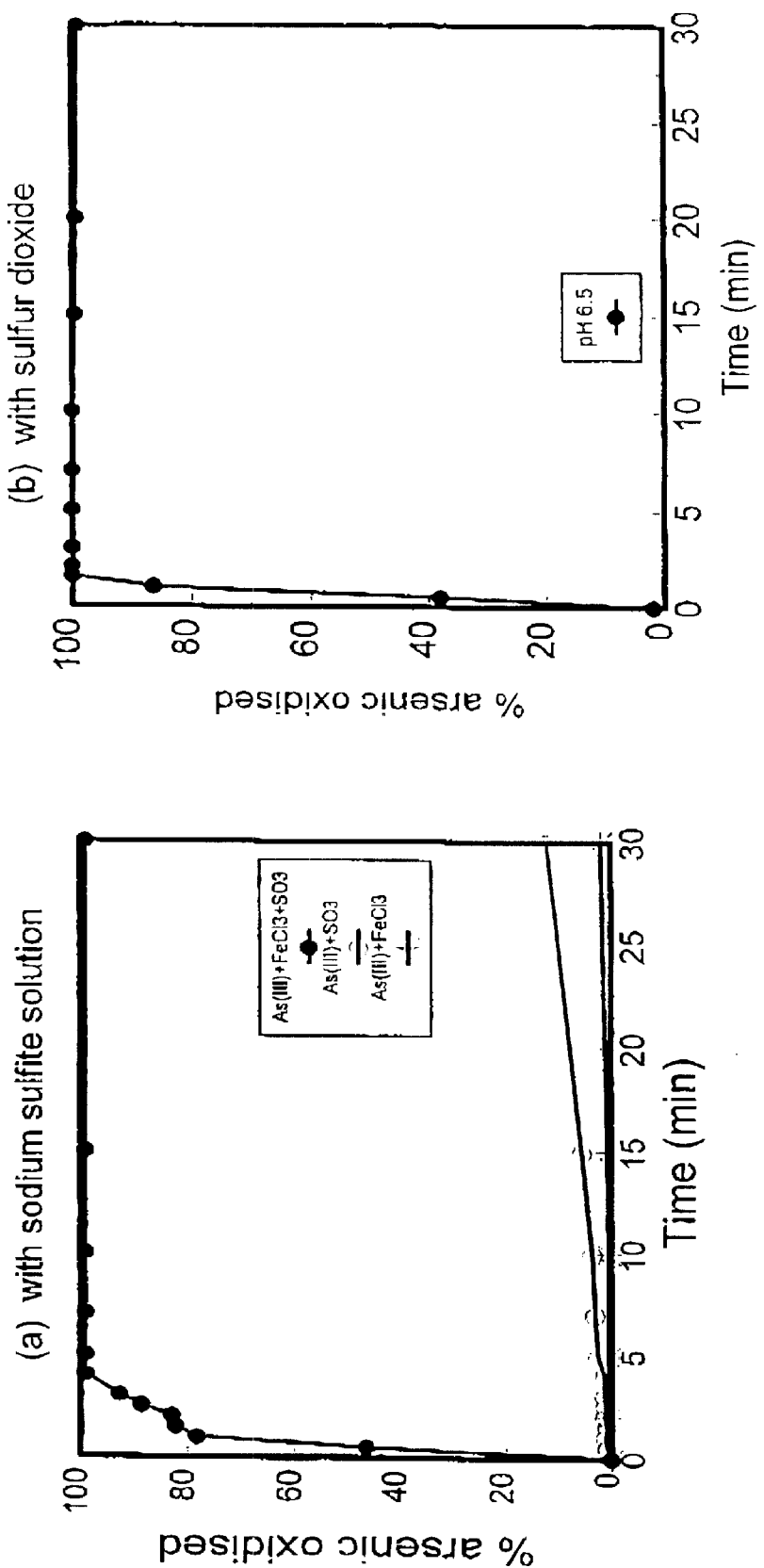
FIGS. 5 (a) and (b) graph the oxidation of 0.5 mg/L arsenic(III) at pH 6.5 using in (a) sodium sulfite solution added at 0.8 mg S/L/min in the absence and presence of 6 mg Fe/L.

FIG. 5(a) shows the oxidation of 0.5 mg/L As(III) when sodium sulfite solution was added at 0.8 mg S/L and air was sparged at 2.5 L/min in the absence and presence of iron which was added at 6 mg Fe/L (at pH 6.5) The presence of iron accelerated the oxidation of arsenic(III). In the absence of sulfite, arsenic oxidation did not occur.

In FIG. 5(b), the oxidation experiment at pH 6.5 was repeated using sulfur dioxide gas (0.02 L/min) instead of sodium sulfite solution. Experimental results very similar to those shown in FIG. 5(a) were obtained. Iron was added at 4 mg Fe/L and air was sparged at 2.5 L/min.

Removal of Dissolved Manganese (II) by Oxidative Precipitation

A reaction mixture (1700 mL) containing 5 or 0.5 mg/L Mn(II) (typical concentrations in lakes, reservoirs and ground water for drinking water supply are less than 1 mg/L), was prepared by dissolving $MnSO_4.4H_2O$ in demineralised water. Iron was added as ferric chloride to give the required iron concentration value The solution pH was controlled at the selected value using an automatic titrator which added sodium hydroxide solution when required. Sodium sulfite was added by the continuous injection of a stock solution (1.7 g/L of sulfite or 0.68 g S/L) at a precisely controlled flow rate using a titrator in order to give the required dose rate. For example, for a dose rate of 2 mg/L/min (for an initial Mn(II) concentration of 0.5 mg/L), 2 mL/min of the sodium sulfite stock solution was injected into the 1.7 L of reaction mixture. This method of sulfite dosing was observed to be more efficient than a procedure whereby the sodium sulfite was added in a single dose. It also simulated the procedure where $SO_2$ gas was used. Air was sparged at a rate of 2.5 L/min.

Alternatively, $SO_2$ gas was used instead of sulfite solution by mixing $SO_2$ gas and air in various proportions and in different flow rates.

Samples of the reaction mixture were taken at specified time intervals. For manganese removal experiments, the collected samples were filtered using a 0.45 µm membrane. The residual manganese concentrations in the filtrate were analysed using ICP-MS, ICP-AES or atomic absorption spectroscopy with a graphite furnace (after acidification to pH<1.5).

Total As and As(III) concentrations were determined using atomic absorption spectroscopy with hydride generation Concentrations of As(V) in the reaction mixture were determined using the molybdenum blue spectrophotometric method (Johnson D and Pilson M., Analytical Chimica Acta, 58, 289–299 (1972)). Sulphite concentrations were also determined spectrophotometrically (Humphrey R. E., Ward M. H. and Hinze W., Analytical Chemistry, 42, 698–702 (1970)).

Electron Paramagnetic Resonance Spectroscopy

For experiments where concentrations of dissolved divalent manganese (aquated manganese(II)) in the solution were specifically analysed using electron paramagnetic resonance spectroscopy (EPR), the procedure was as follows. Approximately 1 mL of the sample of reaction mixture was placed in a fused-silica tube (Wilmad Glass Co., USA) EPR spectroscopy analysis was performed for aquated manganese(II) using a Bruker ER200D spectrometer with a microwave frequency of 9.26±0.02 GHz. Calibration curves were prepared from standard solutions, where the normalised peak height of the fourth peak from the low field side was plotted as the dependent variable. All EPR spectroscopy spectra were run at a controlled room temperature of 20±2° C.

Source of Oxidant

Oxygen was the oxidant for the process. It was typically supplied as air at about 0.2 atmospheres partial pressure by aerating the reaction mixture. Alternatively, oxygen was supplied by sparging a gas mixture of sulfur dioxide with air, or an oxygen/nitrogen mixture into the solution (or any other compatible gas source). Oxygen partial pressures greater than or less than 0.2 atm were also used as appropriate.

Whilst the invention has been described with reference to a number of preferred embodiments, it should be appreciated that the invention can be embodied in many other forms.

What is claimed is:

1. A method for oxidising an inorganic species in an aqueous solution of pH 5 or greater, comprising the steps of:
   (i) supplying an oxidisable form of a sulfur compound, and oxygen to the solution; and
   (ii) adding a source of iron to the solution and allowing oxidation to take place wherein said source of iron provides an iron based catalyst for the oxidation reaction.

2. A method as claimed in claim 1 wherein the source of iron is an iron(III) containing water soluble compound.

3. A method as claimed in claim 1 wherein iron(II) is supplied to the solution in a form which can be readily oxidised to iron(III), which then participates in the oxidation reaction.

4. A method as claimed in any one of the preceding claims wherein, subsequent to oxidation of the species, the iron product resulting from the added iron acts as a coagulant for the oxidised species.

5. A method as claimed in claim 1 wherein the oxygen is supplied to the solution as air.

6. A method as claimed in claim 1 wherein the oxidisable form of a sulfur compound is selected from a group consisting of $SO_3^{2-}$, $S_2O_3^{2-}$, $S_4O_6^{2-}$, $SO_2(g)$, aqueous $SO_2$, or $HSO_3$.

7. A method as claimed in claim 6 wherein the oxidisable source of sulfur is sulfur dioxide and/or sulfite.

8. A method as claimed in claim 1 that is applied in the treatment of trace quantities of inorganic species.

9. A method as claimed in claim 1 wherein the species oxidised is manganese.

10. A method as claimed in claim 1 wherein the species oxidised is arsenic.

11. A method as claimed in claim 1 wherein the species oxidised is at least one species selected from a group consisting of sulfide, selenium uranium, cobalt, antimony, bismuth.

12. A method as claimed in claim 1 wherein the oxygen is sparged into the aqueous solution as air.

13. A method as claimed in claim 1 wherein the solution is selected from a group consisting of a drinking water solution, an industrial waste water or an aqueous process liquor.

14. A method as claimed in claim 1 wherein the pH of the solution is neutral or basic.

* * * * *